Dec. 5, 1939.  A. CLARKSON  2,182,450
FLUID PRESSURE CONTROLLED SWITCH
Filed Nov. 28, 1938  3 Sheets-Sheet 1
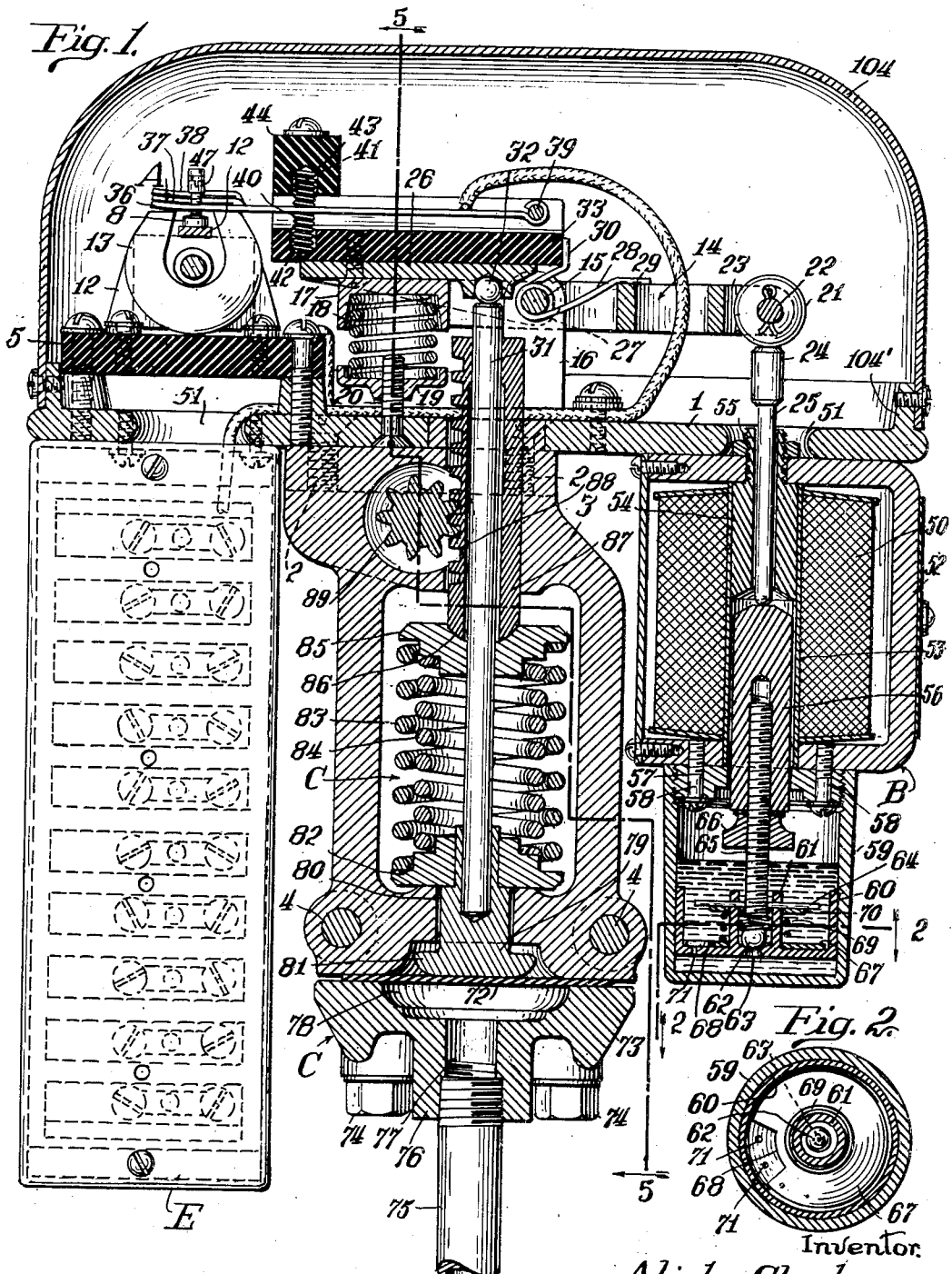
Inventor
Alick Clarkson
By Barnett & Truman
Attorneys.

Dec. 5, 1939.  A. CLARKSON  2,182,450
FLUID PRESSURE CONTROLLED SWITCH
Filed Nov. 28, 1938   3 Sheets-Sheet 2

Inventor
Alick Clarkson
By Barnett & Truman
Attorneys

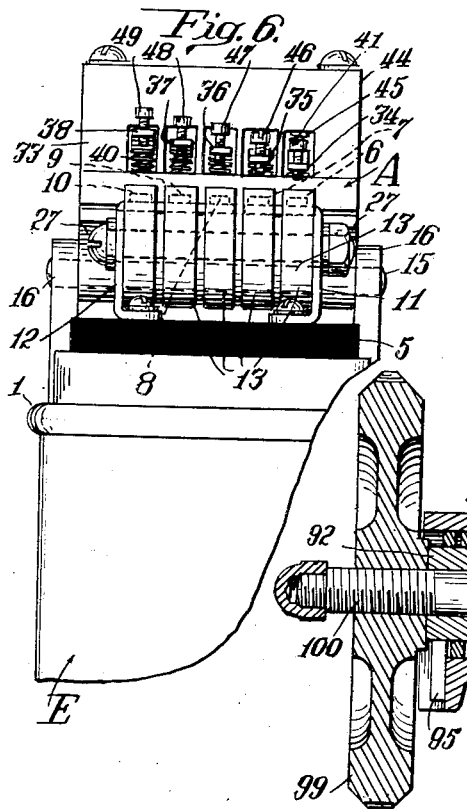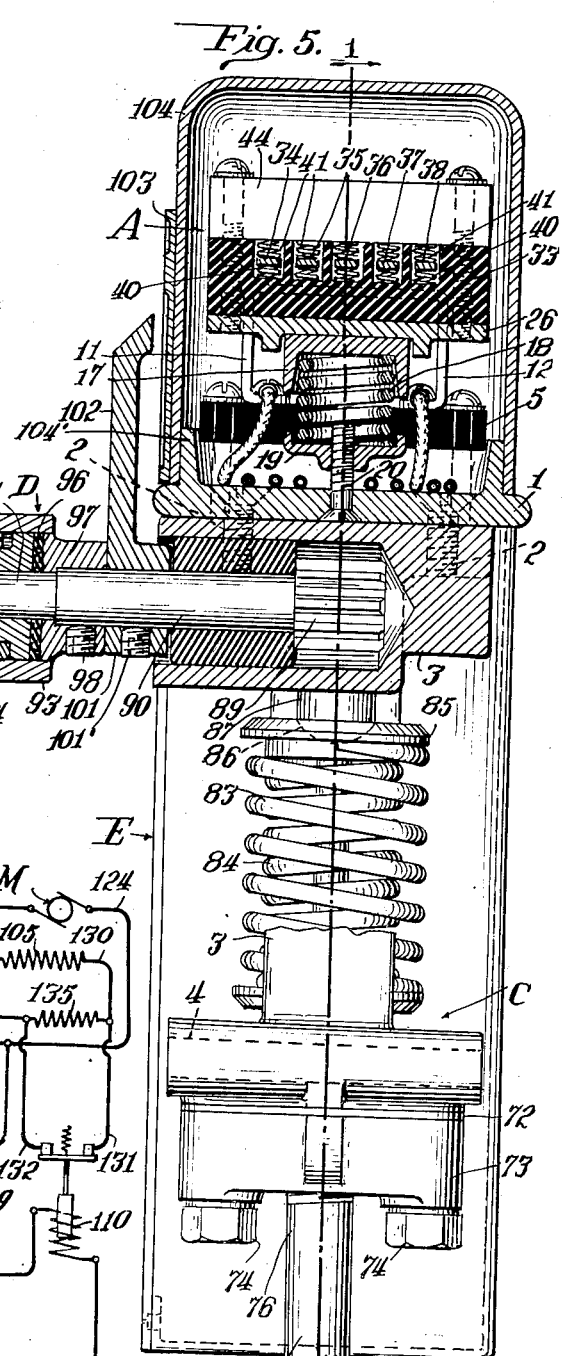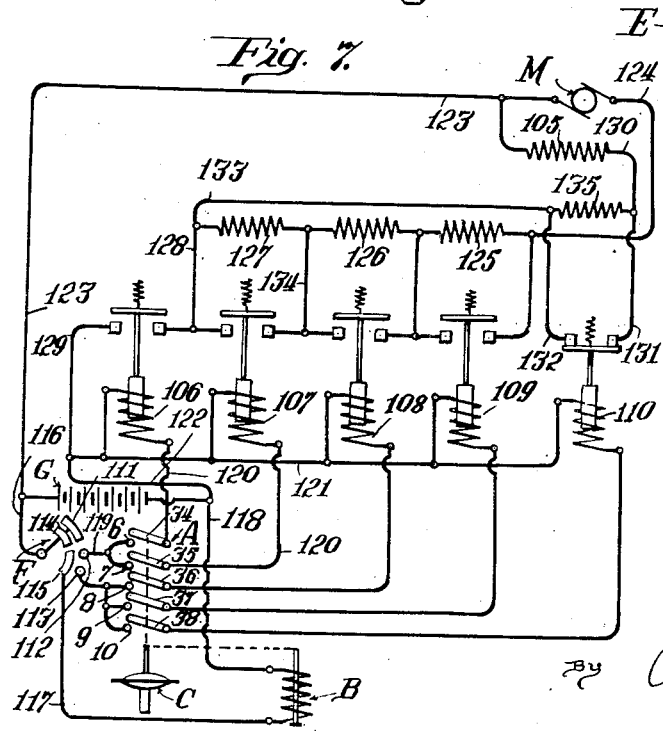

Patented Dec. 5, 1939

2,182,450

UNITED STATES PATENT OFFICE 2,182,450

FLUID PRESSURE CONTROLLED SWITCH

Alick Clarkson, Bloomingdale Township, Du Page County, Ill.

Application November 28, 1938, Serial No. 242,708

20 Claims. (Cl. 200—83)

This invention relates to a new and improved fluid-pressure controlled switch, and more particularly to a motor-starter switch comprising a plurality of successively engaged contacts, said multiple switch being opened and closed automatically in response to both electrical and fluid-pressure operated means.

While this improved switch might be used for a variety of purposes, it has been primarily designed for use as the starter switch for the motor of a steam generating plant, for example the blower motor of a fluid-fuel burner. The starter switch comprises a plurality of separate switches adapted to be successively closed in timed relation but more or less simultaneously and rapidly opened. The starter switch is adapted to be closed electrically whenever a main switch in a main control circuit is closed, and the starter switch will be automatically opened whenever this main circuit is broken, either by opening the main switch or through any other failure of the current in the main control circuit. Additional fluid-pressure operated means is provided for opening the starter switch to stop the motor whenever a certain maximum fluid pressure is exceeded, and for again successively closing the several starter switches to again start the motor whenever the fluid-pressure drops below the desired maximum. The switch assembly can be set to maintain any desired steam-pressure within certain limits, for example 150 pounds per square inch. When the main switch is closed, the individual starter switches will automatically be closed in succession and the motor will operate until the desired steam pressure has been established, whereupon the starter switches will be automatically opened. The starter switches will again be closed when the pressure drops below the predetermined setting, for example 150 pounds per square inch. This cycle of operations will be repeated automatically as long as the main switch remains closed, but whenever the main control switch is opened the starter switches will automatically open and the motor will not operate, no matter what the fluid pressure may be.

The principal object of this invention is to provide an improved automatically controlled starter switch of the type briefly described hereinabove and disclosed more in detail in the specifications which follow.

Another object is to provide an improved fluid-pressure operated control means for a starter switch.

Another object is to provide improved electrically operated control means for closing and opening a starter switch.

Another object is to provide improved means for manually setting the fluid-pressure to be maintained.

Other objects and advantages of this invention will be more apparent from the following detailed description of one approved form of switch assembly constructed and operating according to the principles of this invention.

In the accompanying drawings:

Fig. 1 is a vertical section taken substantially on the line 1—1 of Fig. 5, the terminal box being shown in elevation.

Fig. 2 is a horizontal section taken substantially on the line 2—2 of Fig. 1.

Fig. 5 is a vertical section taken substantially on the line 5—5 of Fig. 1.

Fig. 6 is an end elevation of the starter switch portion of the mechanism.

Fig. 7 is a wiring diagram.

Figure 3:
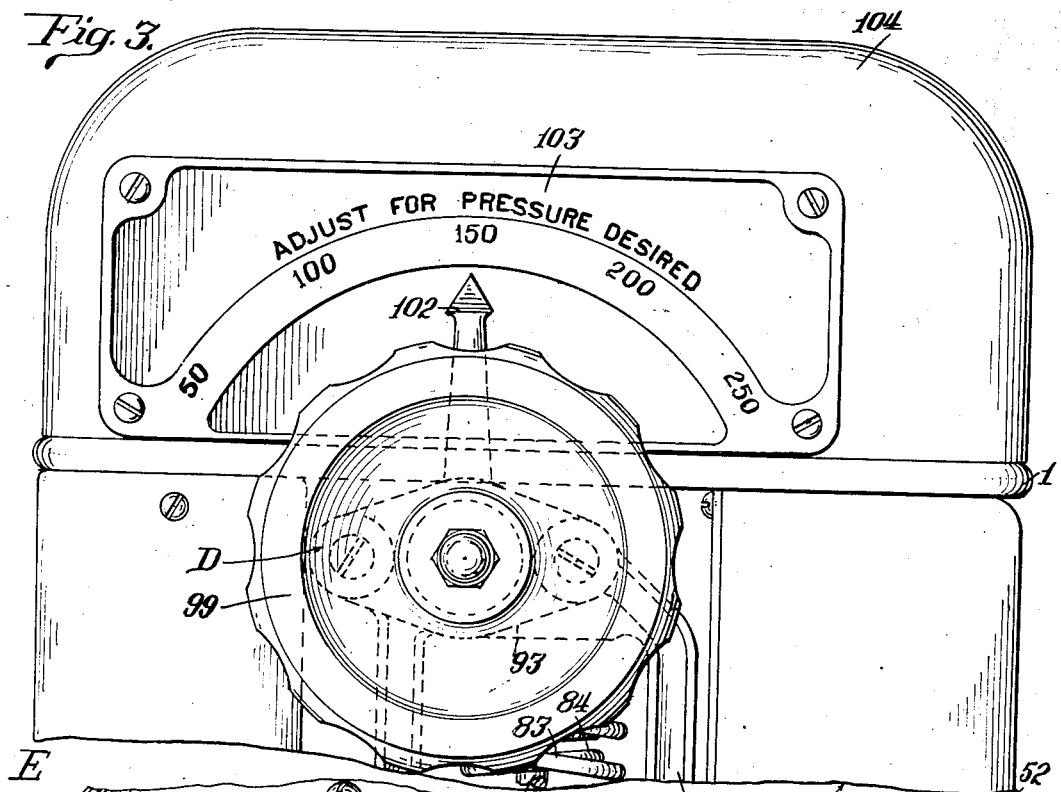
Fig. 3 is a front elevation of the upper portion of the assembly, showing the pressure-setting and indicating mechanism.

Briefly described, the apparatus comprises a starter-switch assembly A, an electromagnetically actuated device B for opening and closing the switch, a fluid-pressure actuated assembly C for opening and closing the switch, a mechanism D for selecting the pressure at which mechanism C shall operate to open the switch, and the terminal box E for the electrical connections.

The starter-switch assembly A is mounted on a base plate 1 centrally secured by screws 2 to the upper end of a main casting 3 supported by bolts 4 from some adjacent stationary framework. The block of insulating material 5 mounted near one end of base plate 1 supports the fixed contacts 6, 7, 8, 9 and 10 (Fig. 6) of a plurality of individual starter-switches. In the present example, the fixed contacts 6 and 7 are carried by a metallic bracket member 11 supported at one end of the group, whereas the other three contacts 8, 9 and 10 are carried by a similar bracket member 12 at the other end of the group. It will be understood that two of the circuit wires hereinafter referred to extend from the brackets 11 and 12 respectively. Each of the fixed contacts 6 to 10 inclusive is positioned between the upwardly extending legs of a horseshoe-shaped permanent magnet 13. There is an individual magnet for each switch.

A main operating lever 14 is centrally pivoted on the fulcrum pin 15 supported between a pair of ears 16 projecting upwardly from base plate 1 at the respective sides thereof. A spring cup 17 formed at the inner end of lever 14 receives the upper end of a compression spring 18 carried at its lower end by the spring cup 19 adjustably mounted on screw 20 projecting upwardly from base plate 1. Spring 18 is under constant compression and tends to swing the inner end of lever 14 upwardly or in a clockwise direction (Fig. 1) so as to open these switches. A roller 21 is pivoted on fulcrum pin 22 in the outer forked end portion 23 of lever 14. Roller 21 is adapted to be engaged by the head 24 at the upper end of plunger-pin 25 operated by the electromagnetic actuating device B as hereinafter described. When pin 25 is elevated, the lever 14 will be swung in a counter-clockwise direction (Fig. 1) against the opposition of spring 18 so as to close the starter switches.

An auxiliary contact-carrying lever or carriage 26 is also fulcrumed on pin 15 by means of a pair of ears 27 projecting downwardly at the sides of main operating lever 14. A torsion spring 28 coiled around pin 15 has end portions 29 and 30 engaging portions of the levers 14 and 26 respectively so as to normally hold the carriage 26 down against the inner end portion of lever 14 so that the two levers will swing in unison. However, the spring 28 will yield to permit the carriage 26 and the contacts carried thereby to be swung upwardly independently of lever 14. This is accomplished by means of a plunger 31 which projects upwardly through an open portion of lever 14 and engages a ball 32 fixed in the lower surface of lever 26 adjacent its axis. The plunger 31 is operated by the fluid pressure actuated mechanism C as hereinafter described.

The movable switch-contact mechanism is carried by a block of insulating material 33 mounted on the metallic lever arm 26. A plurality of separate contact-carrying arms 34, 35, 36, 37 and 38 are mounted in separate slots in insulating block 33 and are pivoted at their inner ends on the horizontally extending pin 39 at the inner end of block 33. Adjacent the outer end of block 33, each of the arms is mounted between a pair of small compression springs 40 and 41. Spring 40 is confined between the lower surface of the arm and the bottom of a centering recess 42 in block 33, while the other spring 41 is confined between the upper surface of the arm and the top of a similar recess 43 in a crossbar 44 of insulating material secured across the upper surface of block 33. The several movable switch contacts 45, 46, 47, 48 and 49 are in the form of screws adjustably mounted in the outer end portions of the several arms 34 to 38 respectively. These movable contacts 45 to 49 respectively are adapted to engage with the fixed contacts 6 to 10 previously described. It will be noted (see particularly Fig. 6) that while the central contact arm 36 is substantially straight, the outer end portions of arms 35 and 34 are deflected downwardly, whereas the outer end portions of arms 37 and 38 are deflected upwardly so that the several movable contacts are positioned in staggered relation when the switches are opened as in Figs. 4 and 6, the contact 45 at one end of the series being lowermost, and the contact 49 at the other end of the series being uppermost. When contact-carrying lever 26 is swung slowly in a counter-clockwise direction (Fig. 4) the arm 34 will first be brought within the operating range of its permanent magnet 13 whereupon this arm will be suddenly drawn downwardly (compressing spring 40) so as to engage the pair of switch contacts 6 and 45. After a brief time interval arm 35 will be snapped downwardly by its magnet 13 so as to engage the second pair of switch contacts 7 and 46, and so on throughout the series of switches.

When the operating levers 14 or 26 or both are swung in a clockwise direction the springs 40 will first be compressed until the force developed is sufficient to break the attractive force of magnets 13, whereupon the switch contacts will suddenly snap apart. It will be seen, therefore, that the several switches are both closed and broken with a snap action. Furthermore, since the several contact-carrying arms are pivoted about an axis 39 that is spaced above the axis 15 of the operating levers, it will be apparent that the several movable contacts 45 to 49 inclusive will be moved across the faces of the fixed contacts 6 to 10 with a wiping action so as to keep these contact surfaces clean.

The several conduit wires extending from the individual switch contacts (as well as the conduit wires leading to electro-magnet 50 hereinafter described) extend down through an opening 51 in base plate 1 and are connected with suitable terminals within terminal box E.

The electromagnetic mechanism B comprises a casing 52 suspended from the right-hand end of base plate 1 (Fig. 1) within which casing is housed and supported the solenoid coil 50. Coil 50 is centered about a vertical guide-tube 53 within the upper end of which is fitted the core-plug 54 secured at 55 within the upper wall of casing 52. Plug 54 is centrally bored to act as a guide for the plunger stem 25. The movable core or plunger 56 is guided within the lower portion of tube 53 and through a collar 57 secured by bolts 58 to the lower wall of casing 52. A dashpot casing 59, partially filled with oil, is closed at its bottom and sides and supported by being threaded at its upper end onto the collar 57. The piston 60 has a close sliding fit within casing 59 and is formed with a central upwardly projecting tubular extension 61 open at its top and housing a ball-valve 62 adapted to close a valve opening 63 in the bottom of the piston. A pin 64 extends diametrically through the upper end portion of extension 61 and the lower end of a threaded stem 65. The upper portion of stem 65 is threaded into the movable core 56 and is held in adjusted position by the lock nut 66. An annular closure plate 67 having an outer arcuate recess 68 is held in place against the lower wall of the piston by means of a spring 69 pressing at its upper end against a washer 70 surrounding extension 61 below the pin 64. A plurality of small leak holes 71, of graduated size, are provided in the bottom wall of piston 60, and the rate at which oil can flow through the piston is determined by rotary adjustment of plate 67 so as to uncover more or less of the openings 71.

Figure 4:
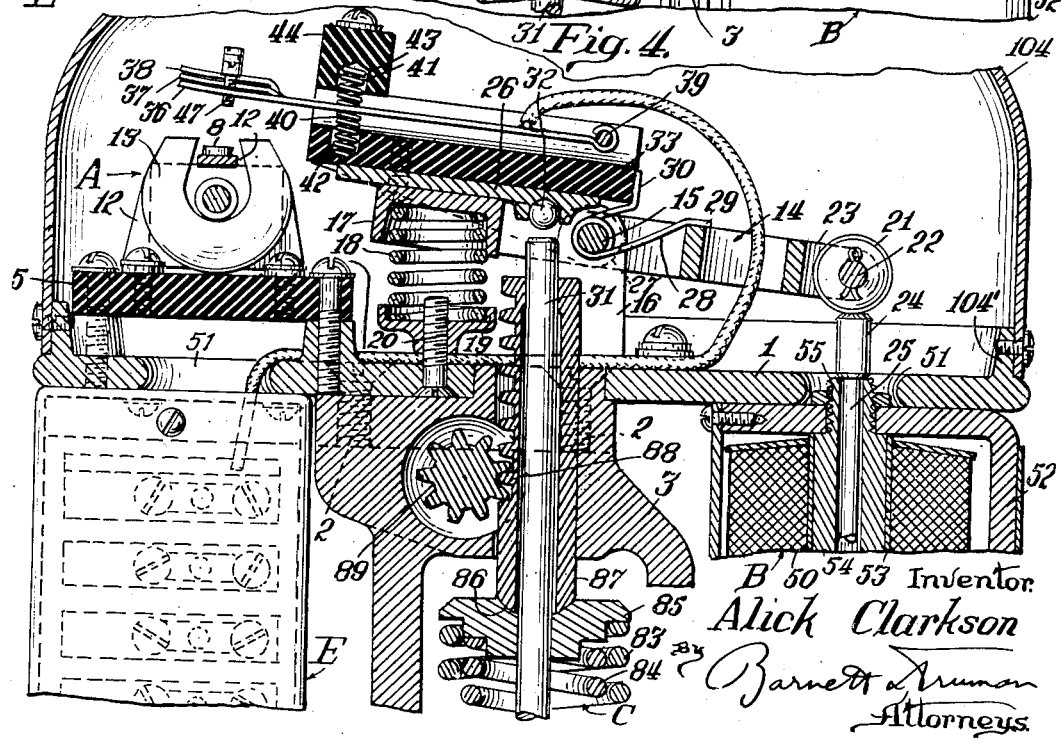
Fig. 4 is a partial vertical section similar to Fig. 1 but showing the starter switch in open position.

Assuming now that the starter switches A are opened as shown in Fig. 4, the plunger pin 25 and core 56 will be lowered and the piston 60 will be near the lower end of casing 59. When a main control switch F (see Fig. 7) is closed, the solenoid 50 will be energized and core 56 will be drawn upwardly thus raising pin 25 and head 24 so as to tilt the main lever 14 in a counterclockwise direction and close the switches A. The rate at which the actuating plunger or core 56 is lifted will be slowed down by the dash-pot, since the plunger 60 is pulled up by stem 65 along with core 56. As the piston 60 is elevated, the ball-valve 62 will automatically close and oil can only flow past the piston through the openings 71 that are not covered by plate 67. As a consequence the core 56 will be lifted rather slowly and the several starting switches A will be closed successively and in timed relation. Whenever the energizing circuit for solenoid 50 is broken, either by opening switch F or through failure of the circuit for any other reasons, the spring 18 will expand to open the switches A. At the same time lever 14 will push down the plungers 24 and 56, and this movement will not be materially retarded by the dash-pot since the ball-valve 62 will automatically lift from its seat and permit a free flow of oil through the central passage 63 in the bottom of the piston.

The fluid-pressure switch-actuating mechanism C comprises a flexible diaphragm 72 clamped between the lower end of main casting 3 and a pressure head 73 secured to the lower end of the main casting by screw bolts 74. A pipe 75 extending from the source of fluid under pressure, for example steam, is threaded into the nipple 76 of head 73 and connected by passage 77 with the pressure chamber 78 below the diaphragm 72. A plunger 79 vertically movable through guide passage 80 in casing 3 has a button 81 at its lower end engaging the upper side of diaphragm 72. The upper end of plunger 79 engages the head or pilot 82 which supports the lower ends of compression springs 83 and 84. The upper ends of these springs engage a similar head 85 having a self-adjusting bearing at 86 against the lower end of a tubular plunger 87 which is normally held in fixed position but may be adjusted vertically by means of the mechanism D hereinafter described. The lower end of the switch-operating plunger 31 is secured in the lower diaphragm-operated plunger 79, and the upper portion of plunger 31 is slidably guided through the tubular plunger 87.

When the fluid-pressure in chamber 78 becomes high enough to overcome the pressure of springs 83 and 84, the plungers 79 and 31 will be lifted thus swinging the auxiliary lever 26 about the fulcrum pin 15 and opening the switches A. It will be understood that as long as solenoid 50 remains energized the main operating lever 14 will remain in the position shown in Fig. 1, but the auxiliary lever 26 will be swung upwardly by the fluid-pressure mechanism C independently of lever 14, the torsion spring 28 flexing to permit movement of lever 26 independently of lever 14. As soon as the fluid-pressure in chamber 78 falls below the predetermined desired maximum pressure, the springs 83 and 84 will again expand to lower plunger 31 and permit the switches A to again be closed by spring 28. However, in case the solenoid 50 should become deenergized, the spring 18 will hold the switches open even though the fluid-pressure should fall below the desired maximum, the plunger 31 simply moving down away from auxiliary lever 26 which is held in elevated position by the main lever 14, as shown in Fig. 4.

It will now be apparent that the exact fluid-pressure required to open the switches A at any time is determined by the fixed compression of springs 83 and 84, and this is adjusted by raising or lowering the tubular plunger 87. One side of plunger 87 is formed with a rack 88 meshing with pinion 89 on the inner end of a horizontal shaft 90 journaled in the fixed casting 3. An outer portion 91 of shaft 90 is rotatably journaled in a drum 92 which in turn is rotatable in one direction only within a yoke member 93 secured to main casting 3. Rotation of the drum 92 in the opposite direction is prevented by a spring-clutch 94 having one end 95 anchored within a slot in the fixed yoke 93, the remainder of the spring being coiled in a counter-clockwise direction (Fig. 3) around a portion of drum 92. Drum 92 can be rotated freely within clutch spring 94 in a clockwise direction but will be gripped by the spring clutch to prevent rotation of the drum in a counter-clockwise direction. A friction disk 96 is interposed between the inner end of drum 92 and a collar 97 fixed on shaft 90 by screw 98. A hand wheel 99 is threaded at 100 on the end portion of shaft 90 so that when the hand wheel is rotated in a right-hand or clockwise direction it will engage the outer end of drum 92 and clamp this drum through friction disk 96 against the fixed collar 97 so that the assembly will turn together with shaft 90 in this clockwise direction.

Another collar 101 fixed by screw 101' on shaft 90 supports an index pointer 102 adapted to cooperate with a dial-plate 103 mounted on the front of cover member 104 secured about the upwardly extending flange 104' of base plate 1 so as to enclose the switch mechanism A. The pointer 102 will indicate on dial 103 the fluid-pressure (for example steam pressure) which the device is set to maintain. As indicated in the drawings, the device is set to maintain a steam pressure of 150 pounds per square inch. In other words, when the steam pressure has risen to 150 pounds, the mechanism C will function to open the switches A. When the steam pressure falls below 150 pounds the switches A will again be permitted to close. If the setting is to be adjusted for a higher pressure, the hand wheel 99 is gripped and rotated in a clockwise direction so as to further compress the springs 83 and 84. As soon as the hand wheel is released, the spring clutch 94 will grip drum 92 and prevent counter-clockwise rotation of the drum, and since drum 92 is now clamped between the hand-wheel 99 and collar 97 which is fixed to the shaft 90, the shaft 90 will also be held against counterclockwise rotation, and the spring assembly 83 and 84 will be held in this adjusted position. If the steam pressure is to be lowered, the hand wheel 99 will be rotated slightly in a counter-clockwise direction. This will at first unscrew the hand-wheel, that is cause the hand-wheel to move on threaded portion 100 of the shaft 90 away from the drum 92 and thus release the grip of the hand wheel on the inner end of drum 92 thus permitting all of the parts to rotate in a counter-clockwise direction, with the exception of the drum 92 which is held against such rotation by spring clutch 94. Assuming that the hand-wheel 99 is still grasped by the operator, any attempted counter-clockwise rotation of shaft 90 in advance of the hand wheel will cause the hand-wheel to move inwardly along threaded portion 100 of the shaft and again clamp the non-rotating drum 92 between the hand-wheel and collar 97 and thus stop further rotation of shaft 90. It will thus be observed that the shaft 90 will closely follow the reverse or counter-clockwise direction of hand wheel 99 but will not move any further than the hand wheel has been adjusted. Shaft 90 can therefore be adjusted by hand wheel 99 in either direction by any desired small increment and will be securely held in any desired adjusted position.

Reference will now be made to Fig. 7 which shows a simplified wiring diagram for this switch. At G is indicated the source of electric power and at M is indicated the motor to be controlled (for example the blower motor of a fluid-fuel-burner) said motor having a shunt field 105. At 106, 107, 108, 109 and 110 are indicated a plurality of similar relays. The switch contacts of relays 106 to 109 inclusive are respectively opened when the relays are deenergized. The switch contacts of relay 110 are normally closed when the relay is deenergized, but are opened when the relay is energized. With the main control switch F open, as shown in Fig. 7, the motor M is at rest, the electromagnet B is deenergized, and all of the starter switches A are open. Assuming now that control switch F is moved to the completely closed position, the movable switch contact 111 will engage the two fixed contacts 112 and 113, and movable contact 114 will engage the fixed contact 115. The electromagnetic device B will now be energized through the following circuit: From battery G through wire 116, switch contacts 114 and 115, wire 117, solenoid B, and wire 118 back to the battery. Starter switches A will now be successively closed at short time intervals. Movable contact 34 will first engage fixed contact 6 thus completing a circuit energizing relay 106 as follows: From the battery through wire 116, switch contacts 111 and 112, wire 119, starter switch contacts 6 and 34, wire 120, relay 106, and wires 121 and 122 back to the battery. The switch contacts of relay 106 will now be closed thus completing a circuit through the armature of motor M as follows: From battery G through wire 123, motor M, wire 124, resistances 125, 126 and 127, wire 128, contacts of relay 106, and wires 129 and 122 back to the battery. At the same time a shunt circuit through the motor field will be completed as follows: From wire 123 through field 105, wires 130 and 131, closed contacts of relay 110, and wires 132 and 133 to wire 128 and thence as before back to the battery.

Shortly thereafter the second pair of starter switch contacts 35 and 7 will be engaged thus energizing relay 107 through a circuit similar to that previously described for relay 106. This will short circuit resistance 127 through wire 134 and the closed contacts of relay 107. In a similar manner, the successive energization of relays 108 and 109 will successively cut out the resistances 126 and 125, thus successively building up the current in the motor-armature circuit. When the last pair of starter switch contacts 38 and 10 are closed, the last relay 110 will be energized so as to open the relay switch contacts and break the shunt circuit through wires 131 and 132 around a resistance 135 so that this resistance will now be thrown into series with the field 105 of the motor so as to increase the motor speed.

It will thus be seen that the simple act of closing the single control switch F will cause electromagnetic device B to close the starter switches A in properly timed relation so as to properly build up the current and speed of the motor M. If switch F is opened, magnet B will be deenergized, and the starter switches A will be automatically opened to stop the motor. The same will happen if electromagnetic device B should become deenergized for any other reason.

Assuming now that the switch F remains closed and the electromagnetic device B remains energized, if the steam or other fluid pressure in the system builds up above the predetermined desired maximum, the pressure-operated device C will function in the manner already described to open the switches A. As soon as the pressure has fallen below the desired maximum, pressure device C will function to permit the starter switches to successively close and again start the motor.

It is sometimes desirable to operate the motor M for a while at a reduced speed, for example while warming up the system preliminary to the normal operation. In order to do this the switch F is moved to an intermediate position so as to engage contact 111 with fixed contact 112 but not to engage the fixed contact 113. The first pair of relays 106 and 107 will now be successively energized to start the motor and then cut out resistance 127, but the motor will then be permitted to run with the resistances 125 and 126 in the armature circuit, and without the resistance 135 in the field circuit. The closing of the remaining starter switches will be ineffective to energize relays 108, 109 and 110 since the circuits for these relays are open at contact 113.

I claim:

1. In combination with a switch, electromagnetically operated means in a control circuit for closing the switch when the control circuit is closed, means for automatically opening the switch when the control circuit is broken, fluid-pressure operated means for opening the switch whenever the pressure exceeds a predetermined maximum even though the control circuit is closed, and means effective only when the control circuit is closed for again closing the switch when the pressure falls below the predetermined maximum.

2. In combination with a switch, electromagnetically operated means in a control circuit for closing the switch when the control circuit is closed, spring means for automatically opening the switch when the control circuit is broken, fluid-pressure operated means for opening the switch whenever the pressure exceeds a predetermined maximum even though the control circuit is closed, and spring means effective only when the control circuit is closed for again closing the switch when the pressure falls below the predetermined maximum.

3. In combination with a switch, electromagnetically operated means in a control circuit for closing the switch when the control circuit is closed, means for automatically opening the switch when the control circuit is broken, fluid-pressure operated means for opening the switch whenever the pressure exceeds a predetermined maximum even though the control circuit is closed, means effective only when the control circuit is closed for again closing the switch when the pressure falls below the predetermined maximum, and means for selecting the fluid pressure at which the switch is opened and closed.

4. In combination, a starting switch comprising a plurality of fixed contacts and a plurality of cooperating movable contacts, a carriage on which the movable contacts are so mounted as to engage successively with the respective fixed contacts as the carriage is moved in a switch-closing direction, spring means for moving the carriage in a switch-opening direction, electrically operated means for moving the carriage in a switch-closing direction, and means for limiting the speed of movement of the carriage in response to the electrically operated means.

5. In combination, a starting switch comprising a plurality of fixed contacts and a plurality of cooperating movable contacts, a carriage on which the movable contacts are yieldably mounted, magnets positioned adjacent the fixed contacts and adapted to respectively attract contacts, the movable contacts being so positioned on the carriage that they will be brought successively within the effective range of the magnets and snapped into contact with the respective fixed contacts as the carriage is moved in a switch closing direction, spring means for moving the carriage in a switch-opening direction, electrically operated means for moving the carriage in a switch-closing direction, and means for limiting the speed of movement of the carriage in response to the electrically operated means.

6. In combination, a starting switch comprising a plurality of fixed contacts and a plurality of cooperating movable contacts, a carriage on which the movable contacts are so mounted as to engage successively with the respective fixed contacts as the carriage is moved in a switch-closing direction, spring means for moving the carriage in a switch-opening direction, electrically operated means for moving the carriage in a switch-closing direction, means for limiting the speed of movement of the carriage in response to the electrically operated means, and fluid-pressure operated means for moving the carriage to open the switch whenever the pressure rises above a predetermined selected pressure.

7. In combination, a starting switch comprising a plurality of fixed contacts and a plurality of cooperating movable contacts, a carriage on which the movable contacts are yieldingly mounted, magnets positioned adjacent the fixed contacts and adapted to respectively attract contacts, the movable contacts being so positioned on the carriage that they will be brought successively within the effective range of the magnets and snapped into contact with the respective fixed contacts as the carriage is moved in a switch-closing direction, spring means for moving the carriage in a switch-opening direction, electrically operated means for moving the carriage in a switch-closing direction, means for limiting the speed of movement of the carriage in response to the electrically operated means, and fluid-pressure operated means for moving the carriage to open the switch whenever the pressure rises above a predetermined selected pressure.

8. In combination, a starting switch comprising a plurality of fixed contacts and a plurality of cooperating movable contacts, a carriage on which the movable contacts are so mounted as to engage successively with the respective fixed contacts as the carriage is moved in a switch-closing direction, a spring for moving the carriage in a switch-opening direction, an electromagnetically operated device for moving the carriage in a switch-closing direction in opposition to the spring, and a dash-pot for limiting the speed of movement of the carriage in the switch-closing direction.

9. In combination, a starting switch comprising a plurality of fixed contacts and a plurality of cooperating movable contacts, a carriage on which the movable contacts are yieldingly mounted, magnets positioned adjacent the fixed contacts and adapted to respectively attract the movable contacts, the movable contacts being so positioned on the carriage that they will be successively brought within the effective range of the magnets and snapped into contact with the respective fixed contacts as the carriage is moved in a switch-closing direction, a spring for moving the carriage in a switch-opening direction, an electromagnetically operated device for moving the carriage in a switch-closing direction in opposition to the spring, and a dash-pot for limiting the speed of movement of the carriage in the switch-closing direction.

10. In combination, a starting switch comprising a plurality of fixed contacts and a plurality of cooperating movable contacts, a carriage on which the movable contacts are so mounted as to engage successively with the respective fixed contacts as the carriage is moved in a switch-closing direction, a spring for urging the carriage in a switch-closing direction, and a pressure-operated device for swinging the carriage in opposition to the spring to open the switch whenever the pressure rises above a predetermined selected maximum.

11. In combination, a starting switch comprising a plurality of fixed contacts and a plurality of cooperating movable contacts, a carriage on which the movable contacts are yieldingly mounted, magnets positioned adjacent the fixed contacts and adapted to respectively attract the movable contacts, the movable contacts being so positioned on the carriage that they will be successively brought within the effective range of the magnets and snapped into contact with the respective fixed contacts as the carriage is moved in a switch-closing direction, a spring for urging the carriage in a switch-closing direction, and a pressure-operated device for swinging the carriage in opposition to the spring to open the switch whenever the pressure rises above a predetermined selected maximum.

12. In combination with a switch comprising fixed and movable contacts, a pivoted carriage on which the movable contact is mounted, a pivoted operating lever, a spring connection between the carriage and lever normally holding the carriage to the lever in a switch-closing direction, the lever positively moving the carriage therewith in a switch-opening direction, a fluid-pressure means operative to move the carriage and open the switch independently of the lever and in opposition to the spring connection when the pressure exceeds a predetermined maximum, the spring connection again closing the switch when the pressure falls below the maximum, a second spring means for normally swinging the lever and carriage in a direction to open the switch, and electromagnetically operated means operative while a control circuit remains closed for swinging the lever and carriage in opposition to the second spring means to close the switch.

13. In combination with a switch comprising fixed and movable contacts, a pivoted carriage on which the movable contact is mounted, a pivoted operating lever, a spring connection between the carriage and lever normally holding the carriage to the lever in a switch-closing direction, the lever positively moving the carriage therewith in a switch-opening direction, a fluid-pressure means operative to move the carriage and open the switch independently of the lever and in opposition to the spring connection when the pressure exceeds a predetermined maximum, the spring connection again closing the switch when the pressure falls below the maximum, a second spring means for normally swinging the lever and carriage in a direction to open the switch, electromagnetically operated means operative while a control circuit remains closed for swinging the lever and carriage in opposition to the second spring means to close the switch, and means for selecting the fluid-pressure at which the switch will be opened and closed.

14. In combination, a starting switch comprising a plurality of fixed contacts and a plurality of cooperating movable contacts, a pivoted carriage, the movable contacts being pivotally mounted on the carriage about an axis spaced from the axis of the carriage so that as the carriage is swung in a switch-closing direction and movable contacts will be successively brought into wiping engagement with the fixed contacts, magnets positioned adjacent the fixed contacts and adapted to respectively attract the movable contacts, and springs for yieldingly holding the movable contacts in predetermined positions on the carriage so that they may swing independently of the carriage into engagement with the fixed contacts when successively brought within operative range of the respective magnets.

15. In combination, a switch comprising relatively movable contacts, a carriage on which one of the contacts is mounted, means normally urging the carriage in a switch-closing direction, fluid-pressure operated means adapted to move the carriage in a switch-opening direction, a normally fixed member, a spring interposed between the normally fixed member and the fluid-operated means to oppose the switch-opening movement, and means for adjusting the last-mentioned spring to determine the fluid-pressure that will open the switch, said adjusting means comprising a rotatable shaft for moving the normally fixed member, means for rotating the shaft and holding same in adjusted position, a pointer fixed on the shaft to swing therewith, and a dial cooperating with the pointer to indicate the fluid-pressure for which the switch is set.

16. In combination, a switch comprising relatively movable contacts, a carriage on which one of the contacts is mounted, means normally urging the carriage in a switch-closing direction, fluid-pressure operated means adapted to move the carriage in a switch-opening direction, a normally fixed member, a spring interposed between the normally fixed member and the fluid-operated means to oppose the switch-opening movement, and means for adjusting the last-mentioned spring to determine the fluid-pressure that will open the switch, said adjusting means comprising a rotatable shaft for moving the normally fixed member, a collar fixed on the shaft, a drum rotatable on the shaft, a hand-wheel threaded on the shaft and adapted when swung in one direction to engage one end of the drum and clamp the drum against the fixed collar to rotate the shaft in this direction, and a clutch member holding the drum against rotation in the opposite direction.

17. In combination, a switch comprising relatively movable contacts, a carriage on which one of the contacts is mounted, means normally urging the carriage in a switch-closing direction, fluid-pressure operated means adapted to move the carriage in a switch-opening direction, a normally fixed member, a spring interposed between the normally fixed member and the fluid-operated means to oppose the switch-opening movement, and means for adjusting the last-mentioned spring to determine the fluid-pressure that will open the switch, said adjusting means comprising a rotatable shaft for moving the normally fixed member, a collar fixed on the shaft, a drum rotatable on the shaft, a hand-wheel threaded on the shaft and adapted when swung in one direction to engage one end of the drum and clamp the drum against the fixed collar to rotate the shaft in this direction, a clutch member holding the drum against rotation in the opposite direction, a pointer fixed on the shaft to swing therewith, and a dial cooperating with the pointer to indicate the fluid-pressure for which the switch is set.

18. In combination, a switch comprising fixed and movable contacts, a carriage on which the movable contact is mounted, a spring normally urging the carriage in a switch-closing direction, a plunger positioned at one end to engage and move the carriage in a switch-opening direction in opposition to the spring, a fluid-pressure chamber, a diaphragm forming one wall of said chamber, a head at the other end of said plunger movable by said diaphragm, a spring engaging said head to oppose its movement by the fluid-pressure, and means for adjusting said spring to determine the fluid-pressure that will open the switch, said adjusting means comprising a second movable head engaging the other end of the spring, a rack extending from the second head, a pinion engaging the rack, a pinion shaft on which the pinion is fixed, means for rotating the shaft and holding same in adjusted position, a pointer fixed on the shaft to swing therewith, and a dial cooperating with the pointer to indicate the fluid-pressure for which the switch is set.

19. In combination, a switch comprising fixed and movable contacts, a carriage on which the movable contact is mounted, a spring normally urging the carriage in a switch-closing direction, a plunger positioned at one end to engage and move the carriage in a switch-opening direction in opposition to the spring, a fluid-pressure chamber, a diaphragm forming one wall of said chamber, a head at the other end of said plunger movable by said diaphragm, a spring engaging said head to oppose its movement by the fluid-pressure, and means for adjusting said spring to determine the fluid-pressure that will open the switch, said adjusting means comprising a second movable head engaging the other end of the spring, a rack extending from the second head, a pinion engaging the rack, a pinion shaft on which the pinion is fixed, a collar fixed on the shaft, a drum rotatable on the shaft, a friction disc interposed between the adjacent ends of the collar and drum, a hand-wheel threaded on the shaft and adapted when swung in one direction to engage the opposite end of the drum and clamp the drum between the friction disc and the wheel whereby the drum will rotate with the wheel and shaft in one direction, and a spiral clamping spring fixed at one end and surrounding the drum to automatically clamp the drum and prevent its rotation in a direction opposite to its first-mentioned direction of rotation with the shaft.

20. In combination, a switch comprising fixed and movable contacts, a carriage on which the movable contact is mounted, a spring normally urging the carriage in a switch-closing direction, a plunger positioned at one end to engage and move the carriage in a switch-opening direction in opposition to the spring, a fluid-pressure chamber, a diaphragm forming one wall of said chamber, a head at the other end of said plunger movable by said diaphragm, a spring engaging said head to oppose its movement by the fluid-pressure, and means for adjusting said spring to determine the fluid-pressure that will open the switch, said adjusting means comprising a second movable head engaging the other end of the spring, a rack extending from the second head, a pinion engaging the rack, a pinion shaft on which the pinion is fixed, a collar fixed on the shaft, a drum rotatable on the shaft, a friction disc interposed between the adjacent ends of the collar and drum, a hand-wheel threaded on the shaft and adapted when swung in one direction to engage the opposite end of the drum and clamp the drum between the friction disc and the wheel whereby the drum will rotate with the wheel and shaft in one direction, a spiral clamping spring fixed at one end and surrounding the drum to automatically clamp the drum and prevent its rotation in a direction opposite to its first-mentioned direction of rotation with the shaft, a pointer fixed on the shaft to swing therewith, and a dial cooperating with the pointer to indicate the fluid-pressure for which the switch is set.

ALICK CLARKSON.